United States Patent Office 2,780,649
Patented Feb. 5, 1957

2,780,649
PREPARATION OF p-ACYLSTYRENES

Jack L. R. Williams, Rochester, N. Y., assignor to Eastman Kodak Company, Rochester, N. Y., a corporation of New Jersey No Drawing. Application November 29, 1952, Serial No. 323,335

1 Claim. (Cl. 260—592)

This invention relates to the preparation of p-acylstyrenes. More particularly, this invention relates to the simultaneous preparation of p-vinylacetophenone, p-diacetylbenzene, and p-divinylbenzene.

In my copending application Serial No. 246,524, filed September 13, 1951 (now abandoned), the method of preparing p-vinylacetophenone from p-acetylphenylmethyl carbinol acetate is described.

I have now found that p-acylphenylmethyl carbinols can be dehydrated to produce the corresponding p-acylstyrenes.

It is, therefore, an object of my invention to provide a method of preparing p-acylstyrenes. Another object is to provide a method of preparing p-vinylacetophenone. Still another object is to provide a method of simultaneously preparing p-vinylacetophenone, p-diacetylbenzene and p-divinylbenzene. Other objects will become apparent from a consideration of the following description and examples.

The p-acylstyrenes obtained according to my invention are useful in the preparation of synthetic resins. Certain derivatives of these resins are characterized by light-sensitive properties, which can be utilized in the photographic art.

According to my invention, I obtain p-acylstyrenes by dehydrating a p-acylphenylmethyl carbinol selected from those represented by the following general formula:

I.

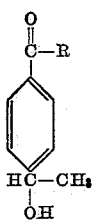

wherein R represents an alkyl group, e. g. methyl, ethyl, n-propyl, isopropyl, etc. The dehydrations are advantageously effected at a temperature of from 150–600° C. Temperatures of from 250–500° C. have been found to be especially useful.

The dehydrations are advantageously effected in the presence of a dehydration catalyst, such as phosphorus pentoxide, alkali metal bisulfates (sodium bisulfate, potassium bisulfate, etc.), alumina (aluminum oxide), silica, glass, silica gel, etc. Alumina has been found to be particularly useful, especially for the dehydration of p-acetylphenylmethyl carbinol, since it provides not only the desired p-vinylacetophenone, but also p-diacetylbenzene and p-divinylbenzene. Both of the latter products are desirable and useful.

The following examples will serve to illustrate more fully the manner whereby I practice my invention.

*Example 1.—p-Acetophenylmethyl carbinol acetate*

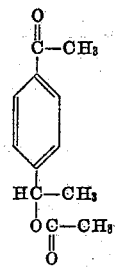

In a standard Parr low-pressure hydrogenation apparatus there were placed 64.8 grams (0.4 mole) of p-diacetylbenzene, 32 grams of freshly prepared, alcohol-washed Raney nickel, and 175 cc. of methanol. The reaction vessel was evacuated and flushed three times with hydrogen in the usual way and pressured to 50 p. s. i. After shaking for 32 minutes the pressure dropped 30 pounds at which time shaking was stopped. (Theory 29 lbs.) The catalyst was removed and the reaction mixture evaporated at the water pump.

No attempt was made to separate the products, but the reaction mixture was acetylated directly by heating with 150 cc. acetic anhydride and 5 cc. pyridine on the steam cone for 16 hours. Distillation through a 6-inch Vigreux-type column resulted in the following fractions:

| No. | B. P., ° C. | 2, 4-dinitrophenyl hydrazine test |
|---|---|---|
| 1 | 94°/1.0 mm. | +red. |
| 2 | 113–116°/0.7 mm. | +yellow. |
| 3 | 116°/0.7 mm. | +yellow. |
| 4 | 118°/0.75 mm. | +yellow. |

Fraction 2 (presumably diacetyl benzene) partially crystallized and crystals of it were filtered off and melted at 104–107° C. after pressing on a porous plate. Fractions 2, 3 and 4 were combined (71 grams) and redistilled to give the following fractions:

| No. | B. P., ° C. |
|---|---|
| 5 | 97–100°/0.2 mm. (crystals) 1 gram. |
| 6 | 100–101°/0.2 mm. (crystals) 2 grams. |
| 7 | 101–103°/0.2 mm. (crystals) 15 grams. |
| 8 | 103–107°/0.2 mm. (no crystals) 50 grams, $n_D^{24.5}$ 1.5168. |

Fraction 1 was probably p-ethyl acetophenone. Fraction 8 was the acetate of p-acetophenyl methyl carbinol.

*Example 2.—p-Acetylphenylmethyl carbinol*

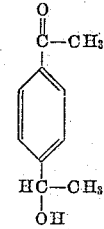

A mixture of 100 grams (0.485 mole) of p-acetylphenylmethyl carbinol acetate, 250 cc. of methanol and 1.0 gram of sodium methoxide was allowed to stand at room temperature (28° C.) for one-half hour during which time the reaction medium turned green. The reaction mixture was made slightly acidic with 5 percent hydrogen chloride in methanol. The excess hydrogen chloride was removed at the water pump and the liquid distilled at atmospheric pressure to give 34 cc. of methyl acetate, B. P. 54°–59° C.

After all of the methanol had distilled the residual liquid was distilled in vacuo through a 6-inch Vigreux type column to yield the following fractions:

|   | B. P., ° C. | $n_D^{25}$ | Weight, grams |
|---|---|---|---|
| 1 | 118–120°/0.4 | 1.5444 | 19 |
| 2 | 120°/0.5 | 1.5462 | 34 |
| 3 | 122°/0.6 | 1.5452 | 8 |

This represents a total of 61 grams (76.8 percent) of p-acetylphenylmethyl carbinol.

*Analysis.*—Calculated for $C_{10}H_{12}O_2$: C, 73.1; H, 7.4. Found: C, 72.7; H, 7.7.

The 2,4-dinitrophenylhydrazone was prepared and after recrystallization from alcohol and water melted at 204–205° C. Recrystallization from hexane gave the same melting point.

*Example 3.—Dehydration of p-acetylphenylmethyl carbinol over alumina*

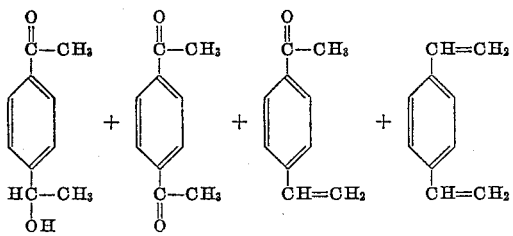

Harshaw activated alumina Al–0104–T—⅛ inch was preheated in a stream of air for six hours at 550° C. The catalyst was cooled to 480° C. and used immediately as follows:

One hundred grams (0.61 mole) of p-acetylphenylmethyl carbinol was passed dropwise at one drop per two sec. through a 25-mm. O. D. Pyrex tube packed for a distance of one inch with glass beads, followed by 28 inches of the above catalyst and finally with one inch of glass beads, and heated to 480–490° C. by means of an electrically heated furnace. The reactants and products were swept through the tube by means of dry nitrogen flowing at the rate of six liters per hour. Several Dry Ice traps were required to condense the gaseous products. The combined condensates were diluted with 200 cc. of benzene, ten grams of water was separated and the organic material dried over anhydrous magnesium sulfate. After the addition of a trace of picric acid the benzene was removed at the water pump. An equal volume of hexane was added to the residue and after cooling in crushed ice, six grams of a white solid, M. P. 109–110° C., was filtered off. This material was p-diacetylbenzene as determined by a mixed melting point, with an authentic sample of p-diacetylbenzene.

The hexane was removed from the mother liquors at the water pump and the residue distilled in vacuo through a 6-inch Vigreux type column to yield the following fractions:

|   | B. P., ° C. | $n_D^{25}$ | M. P. of mass, ° C. |
|---|---|---|---|
| 1 | 48.5–51 (0.75 mm.) | 1.5717 |   |
| 2 | 55–60 (0.75 mm.) | 1.5770 | 8.53 grams, M. P. 4–10°. |
| 3 | 56–70 (0.75 mm.) | 1.5751 |   |
| 4 | 71–73 (0.75 mm.) | 1.5691 | wt. 8.6 grams, 22.5–24.5°. |
| 5 | 73–83 (0.75 mm.) | 1.5720 | wt. 15.5 grams, 24–28°. |

Fraction 4, when pressed on a porous plate, became liquid. Fraction 5 yielded a solid, M. P. 35–36° C.

Fraction 4 yielded 6.8 grams of p-vinylacetophenone, M. P. 34–35° C. when recrystallized from hexane. Similarly, fraction 5 recrystallized from 15 cc. hexane gave 10 grams of p-vinylacetophenone. Total yield 16.8 grams (20.9 percent).

One-gram portions of the following fractions were titrated for unsaturation by the standard bromide-bromate technique, using $\frac{1}{12}$ N solution:

|   | Cc. of bromide-bromate |
|---|---|
| Fractions 1, 2, 3 combined | 46.7 |
| Fraction 4 | 26.19 |
| Fraction 5 | 24.57 |
| Pure p-vinylacetophenone | 28.0 |
| Pure styrene | 38.75 |
| 3,4-dimethyl styrene | 30.13 |

As can be seen from the above data, fractions 1, 2 and 3 (combined) consist largely of p-divinylbenzene. This material can be used directly in the preparation of synthetic resins.

In a manner similar to that illustrated in Example 3, p-butyrylphenylmethyl carbinol can be dehydrated to produce p-butyryl styrene. Also, catalysts other than alumina can be employed in the dehydration, as has been shown above.

The intermediates represented by Formula I above can advantageously be prepared by hydrolysis of the corresponding acetates, as illustrated in Example 2 above. The p-acylphenylmethyl carbinol acetates can advantageously be prepared by hydrogenation of p-alkylacetophenone, followed by acetylation of the carbinol thus produced, and oxidation of the carbinol acetate in the presence of air and chromium sesquioxide and calcium carbonate (as oxidation catalysts) as shown in application Serial No. 246,524 mentioned above.

The particular temperature used will depend somewhat on the catalysts selected and the time of contact between the p-acylphenylmethyl carbinol and the catalyst. The carbinols can be directed through the dehydration apparatus by means of an inert gas, such as nitrogen, carbon dioxide, etc.

The 2,4-dinitrophenylhydrazone, melting at 204–205° C., obtained in Example 2 had the following analysis:

Calculated for $C_{14}H_{16}N_4O_5$: C, 55.8; H, 4.7; N, 16.3. Found: C, 55.8; H, 5.0; N, 16.3.

I have also found a new method of preparing p-divinylbenzene, which comprises heating 1,4-bis($\alpha$-hydroxyethyl)benzene diacetate at a temperature of 500–550° C. The following example briefly describes such a process.

*Example 4*

A mixture of 13.5 g. (0.065 mole) of p-($\alpha$-hydroxyethyl)phenylmethyl carbinol acetate, 20 g. (0.2 mole) of acetic anhydride and 5 drops of pyridine was heated on the steam cone for 16 hours. Distillation of the reaction mixture yielded 21.0 g. (80%) of the diacetate, boiling at 104° C./0.2 mm., $n_D^{25}$ 1.4955. A sample prepared from p-diacetyl benzene had the same constants.

A solution of 21.0 g. (0.084 mole) of 1,4-bis($\alpha$-hydroxyethyl)benzene diacetate in 25.0 cc. of benzene was passed dropwise during the course of one and one-half hours through a 25 mm. O. D. Pyrex tube packed for a distance of 30 inches with glass beads and heated to 525–535° C. by means of an electrically controlled furnace. The reaction products were swept into a Dry Ice trap by a slow stream of nitrogen. The reaction products were melted, washed with water and dried over anhydrous magnesium sulfate. Distillation yielded 7.7 g. (70%) of p-divinylbenzene, boiling point 34° C./0.2 mm. Titration of 0.52 g. of this material with $\frac{1}{12}$ molar bromide-bromate solution required 30.2 cc. corresponding to a purity of 97.6 percent.

In general, the method of Example 4 is not as advantageous as that described in Example 3 above.

What I claim as my invention and desire secured by Letters Patent of the United States is:

A process for simultaneously preparing p-vinylacetophenone, p-diacetylbenzene, and p-divinylbenzene comprising heating p-acetylphenylmethyl carbinol at a temperature of from 480°–490° C. in the presence of alumina, and thereafter separating the p-vinylacetophenone, p-diacetylbenzene, and p-divinylbenzene from the reaction mixture.

References Cited in the file of this patent

UNITED STATES PATENTS

| | | |
|---|---|---|
| 2,291,915 | Palmer | Aug. 4, 1942 |
| 2,427,337 | Abbot | Sept. 16, 1947 |
| 2,495,904 | Pines | Jan. 31, 1950 |
| 2,671,111 | Butler | Mar. 2, 1954 |